UNITED STATES PATENT OFFICE.

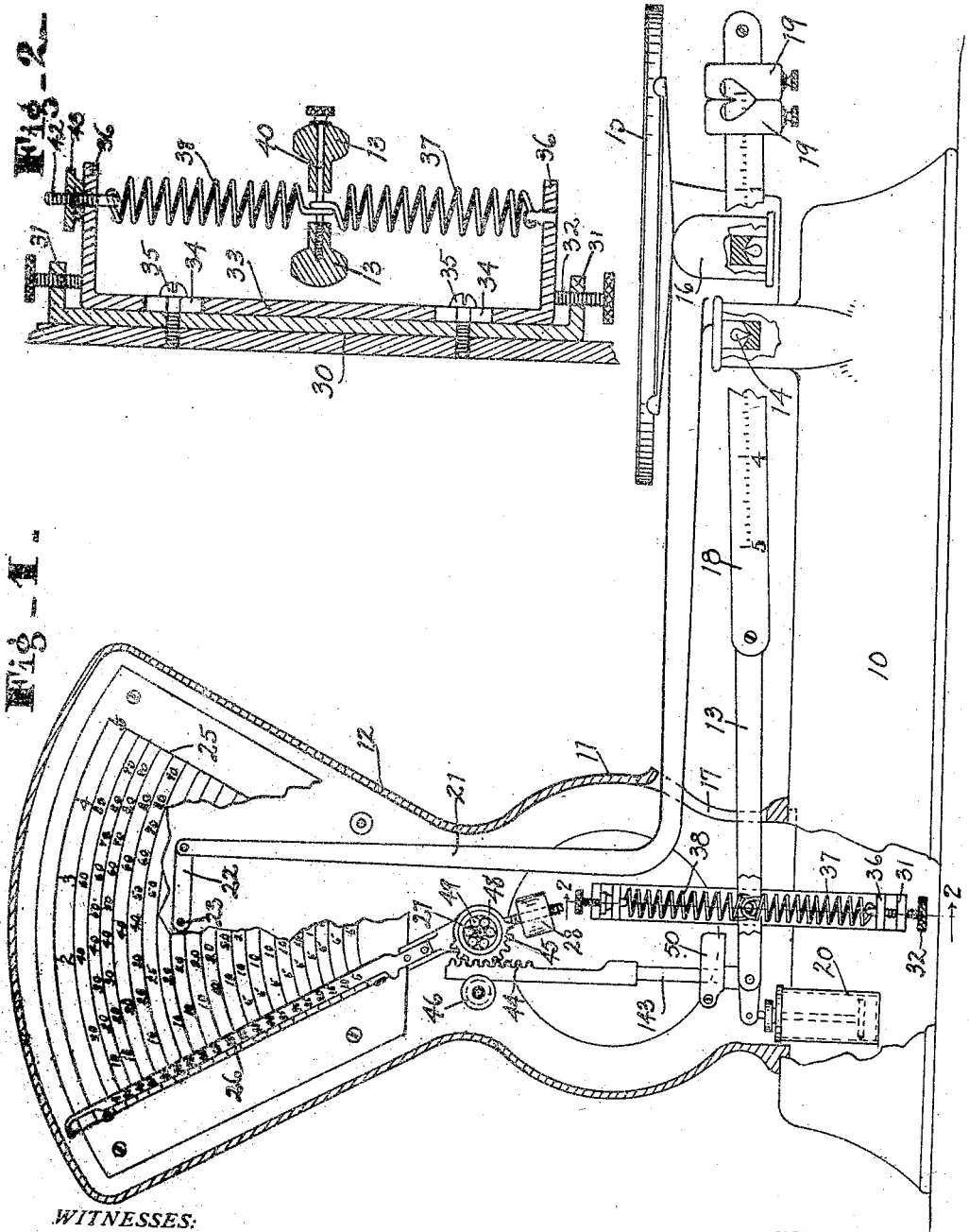

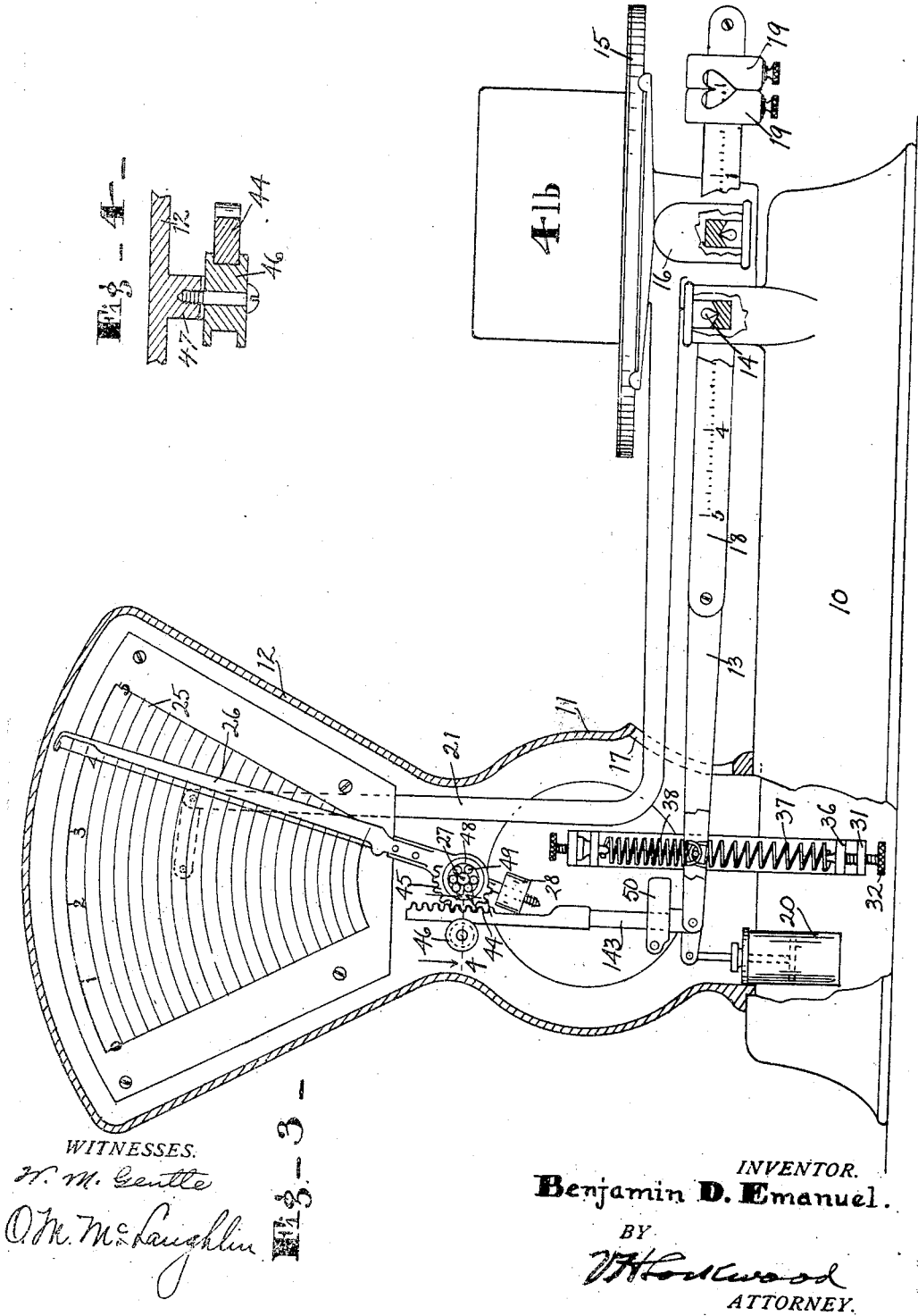

BENJAMIN D. EMANUEL, OF ANDERSON, INDIANA.

WEIGHING-SCALE.

1,031,699.  Specification of Letters Patent.  Patented July 9, 1912.

Application filed August 18, 1910. Serial No. 577,831.

*To all whom it may concern:*

Be it known that I, BENJAMIN D. EMANUEL, of Anderson, county of Madison, and State of Indiana, have invented a certain useful Weighing-Scale; and I do hereby declare that the following is a full, clear, and exact description thereof, reference being had to the accompanying drawings.

The object of this invention is to cheapen, simplify and improve the operation of weighing scales, particularly of the computing type.

The chief feature of the invention consists in the use of a pair of springs exerting opposing influences on the weighing beam, one in opposition to and the other in cooperation with the load receiving member and the load, and connection between an indicator and the weighing beam whereby the beam controls the movement of the indicator to indicate the effect of an applied load.

In the drawings Figure 1 is a central vertical section longitudinally of the scale with parts broken away. Fig. 2 is a section on the line 2—2 of Fig. 1, but on a larger scale, showing, however, only the springs and their mounting. Fig. 3 is a section somewhat similar to that in Fig. 1, showing the position of the parts with a four pound load. Fig. 4 is a section on the line 4—4 of Fig. 3.

There is shown herein a base 10 of ordinary type with a lower housing 11 and an upper housing 12. A scale beam 13 is fulcrumed at 14 between its ends. A load receiving member 15 is carried by said frame outside or to one side of the fulcrum by a bracket 16. The other end of the beam 13 projects into the housing and operates vertically through a slot 17. There is also a tare beam 18 secured to said scale or weighing beam 13 and the tare beam has poises 19 thereon. The inner end of the weighing beam 13 is connected with a dash pot 20 for checking the vibration thereof. There is also an L-shape bar 21 projecting through the slot 17 of the housing with its inner end extending upwardly in the housing and pivoted to the free end of the arm 22 which is pivoted at 23 to the upper housing 12. An outer portion of said bar 21 is horizontal and connected with the bracket 16 which carries the load receiving member. This check is to maintain the load receiving member in a horizontal position.

In the upper housing 12 there is a chart 25 graduated to weight and value indications, but either class of those graduations may be omitted, as desired. An indicator 26 oscillates and moves across the chart as a load is applied and it has on it price-perpound indications which register with the total value indications on the chart. Said indicator is mounted oscillatory on a rod 27 secured to the housing and is provided with an oppositely extending counterweight 28. The function of the counterweight is merely to counterbalance the indicator 26 and not to actuate it.

The foregoing parts of the construction are old and are shown herein merely to illustrate the invention, although some of them may be modified, as I do not wish to limit the invention to any particular construction of weighing scales.

To the lower housing 11 and base 10 a vertical bar 30 is secured and it has inwardly extending upper and lower arms 31 through which set screws 32 project toward each other. A spring holding frame is mounted in connection with said bar 30 so as to be vertically adjusted thereon. It consists of a vertical bar 33 having slots 34 through which headed screws 35 project that screw into the bar 30. The set screws 32 vertically adjust and hold the wire holding frame in position. This frame includes the bar 33 and the upper and lower arms 36 parallel with each other. A lower spring 37 is secured to the lower arm 36 and an upper spring 38 is secured to the upper arm 36. These are spiral springs and oppose each other with adjacent ends secured to a removable rod 40 extending through and between the divided or yoked arms of the beam 13, as shown in Fig. 2. One of the springs is connected with its arm by a screw 42 with a nut 43 thereon so that the tension of both springs can be modified.

A rod 143 is pivoted at its lower end to the beam 13 and carries on its upper end a rack bar 44 that is held against a gear 45 by a roller 46 on an extension 47 from the rear wall of the housing. The gear 45 is secured on a hollow shaft 48 that runs on balls 49 which surround the rod 27. The indicator is secured to the hollow shaft 48. Thus the indicator is mounted by ball bearings on the rod 27 and is actuated in both directions by the weighing beam 13 through the intervening connection described. A weight 50 is secured to the rod 43 or some other part of the weighing beam or its connections for balancing the beam while sealing the scale.

The springs 37 and 38 are spiral retractile springs which are always under some tension or exerting some pull on the beam 13. The springs are so arranged and adjusted that when there is no load their pulls on the beam are equal. When load is applied and the inner end of the beam 13 moves upwardly, the pull of the lower spring 37 will increase while the pull of the upper spring 38 will correspondingly diminish. Hence, the combined action of the springs will vary with the variations in the load. The work of actuating the indicator, since it is balanced, will always be the same. Changes in temperature will not affect the combined action of the springs upon the lever. It will affect both springs similarly, but since their influences are opposite, the temperature changes in the one spring will offset the temperature changes in the other spring.

I claim as my invention:

1. A weighing scale including a base, a housing on one part of the base, a beam fulcrumed between its ends on the base outside of the housing and with one end weighted and normally over-balanced and projecting into the housing, a load receiving member carried by the outer end of said beam, a pair of springs mounted within the housing in connection with the inner end of said lever so as to act oppositely and equally on said beam when there is no load, an indicator fulcrumed in the housing, a connection between the inner end of the beam and the indicator for actuating the latter, and a weight counterbalancing the indicator, substantially as set forth.

2. A weighing scale including a base, a housing extending upwardly therefrom, a weighing beam fulcrumed between its ends on said base outside the housing and with one end projecting into the housing, a load receiving member carried by the outer end of said beam, a vertically adjustable spring support mounted in connection with the housing with one arm above and another arm below said beam, spiral springs of substantially equal character connected with said beam and with the arms of said spring support, one spring above and one below the beam, and means actuated by the inner end of the beam for indicating the effect of an applied load.

In witness whereof, I have hereunto affixed my signature in the presence of the witnesses herein named.

BENJAMIN D. EMANUEL.

Witnesses:
JAMES D. HOPPER,
LUELLA COSTELLO.